United States Patent
Hong et al.

(10) Patent No.: US 10,237,084 B2
(45) Date of Patent: Mar. 19, 2019

(54) METHOD FOR TRANSMITTING AND RECEIVING SINGLE-CELL MULTI-TRANSMISSION DATA AND APPARATUS THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/541,753

(22) PCT Filed: Dec. 30, 2015

(86) PCT No.: PCT/KR2015/014479
§ 371 (c)(1),
(2) Date: Jul. 6, 2017

(87) PCT Pub. No.: WO2016/111498
PCT Pub. Date: Jul. 14, 2016

(65) Prior Publication Data
US 2017/0366363 A1  Dec. 21, 2017

(30) Foreign Application Priority Data

Jan. 8, 2015 (KR) .......... 10-2015-0002930
Dec. 24, 2015 (KR) .......... 10-2015-0185653

(51) Int. Cl.
*H04W 4/08* (2009.01)
*H04L 12/18* (2006.01)
(Continued)

(52) U.S. Cl.
CPC .......... *H04L 12/189* (2013.01); *H04L 12/185* (2013.01); *H04W 4/08* (2013.01);
(Continued)

(58) Field of Classification Search
CPC .... H04L 12/185; H04L 12/189; H04W 4/021; H04W 4/06; H04W 4/08; H04W 48/10;
(Continued)

(56) References Cited

U.S. PATENT DOCUMENTS 9,319,851 B2 *  4/2016  Yu ........................... H04W 4/08
9,462,447 B2 * 10/2016  Miller ..................... H04W 4/22
(Continued)

FOREIGN PATENT DOCUMENTS

CN   103139717 A  *  6/2013
CN   105992158 A  * 10/2016  .............. H04W 4/06
(Continued)

*Primary Examiner* — Eric Nowlin
(74) *Attorney, Agent, or Firm* — IP Legal Services, LLC

(57) ABSTRACT

Provided are a method and an apparatus for providing point-to-multipoint transmission in a single cell in E-UTRAN. The method may include receiving system information for single-cell multi-transmission in a primary cell (PCell); determining whether to transmit a multimedia broadcast multicast service (MBMS) interest information message; and transmitting the MBMS interest information message, wherein the MBMS interest information message is determined to be transmitted when the terminal sets an RRC connection or when interest group communication service information of the previous interest information message, which the terminal transmitted last, has been changed.

15 Claims, 12 Drawing Sheets

(51) Int. Cl.
*H04W 72/00* (2009.01)
*H04W 72/04* (2009.01)
*H04W 72/12* (2009.01)
*H04W 76/27* (2018.01)
*H04W 88/02* (2009.01)
*H04W 88/08* (2009.01)

(52) U.S. Cl.
CPC ......... *H04W 72/042* (2013.01); *H04W 72/12* (2013.01); *H04W 76/27* (2018.02); *H04W 72/005* (2013.01); *H04W 88/02* (2013.01); *H04W 88/08* (2013.01)

(58) Field of Classification Search
CPC . H04W 72/005; H04W 72/042; H04W 72/12; H04W 72/121; H04W 72/1278; H04W 76/27; H04W 76/40; H04W 88/02; H04W 88/08
See application file for complete search history.

(56) References Cited

U.S. PATENT DOCUMENTS

| | | | |
|---|---|---|---|
| 9,473,906 B2 * | 10/2016 | Yu | H04W 4/08 |
| 9,510,161 B2 * | 11/2016 | Yeh | H04W 4/06 |
| 9,668,110 B2 * | 5/2017 | Hu | H04W 4/06 |
| 9,844,039 B2 * | 12/2017 | Shimezawa | H04W 72/04 |
| 9,848,438 B2 * | 12/2017 | Shimezawa | H04L 1/0026 |
| 9,883,355 B2 * | 1/2018 | Lee | H04W 4/08 |
| 9,948,443 B2 * | 4/2018 | Kusashima | H04W 72/042 |
| 10,027,445 B2 * | 7/2018 | Shimezawa | H04L 5/14 |
| 2006/0183498 A1 | 8/2006 | Lee et al. | |
| 2008/0267136 A1 | 10/2008 | Baker et al. | |
| 2013/0083715 A1 * | 4/2013 | Etemad | H04W 52/04 370/312 |
| 2013/0195003 A1 | 8/2013 | Lee et al. | |
| 2014/0105095 A1 | 4/2014 | Lee et al. | |
| 2014/0286223 A1 * | 9/2014 | Yu | H04W 4/08 370/312 |
| 2014/0286225 A1 * | 9/2014 | Yu | H04W 4/08 370/312 |
| 2015/0009881 A1 * | 1/2015 | Yeh | H04W 4/06 370/312 |
| 2015/0071157 A1 | 3/2015 | Jung et al. | |
| 2015/0109989 A1 * | 4/2015 | Hu | H04W 4/06 370/312 |
| 2015/0351119 A1 * | 12/2015 | Song | H04W 72/1268 370/329 |
| 2016/0128065 A1 * | 5/2016 | Miller | H04W 4/22 370/329 |
| 2016/0157065 A1 * | 6/2016 | Lee | H04W 4/08 370/312 |
| 2016/0165412 A1 * | 6/2016 | Lee | H04W 4/08 370/312 |
| 2016/0165413 A1 * | 6/2016 | Bhalla | H04W 4/08 455/456.5 |
| 2016/0192335 A1 * | 6/2016 | Kusashima | H04L 5/0053 370/280 |
| 2016/0205669 A1 * | 7/2016 | Kusashima | H04W 72/042 370/280 |
| 2016/0227385 A1 * | 8/2016 | Ahmad | H04L 65/4061 |
| 2016/0234833 A1 * | 8/2016 | Shimezawa | H04W 72/04 |
| 2016/0234860 A1 * | 8/2016 | Shimezawa | H04L 1/0026 |
| 2016/0241610 A1 * | 8/2016 | Zhang | H04W 4/06 |
| 2016/0248553 A1 * | 8/2016 | Shimezawa | H04L 5/14 |
| 2016/0278042 A1 * | 9/2016 | Kim | H04W 4/06 |
| 2016/0323719 A1 * | 11/2016 | Wang | H04W 4/08 |
| 2016/0323846 A1 * | 11/2016 | Park | H04W 4/08 |
| 2016/0381517 A1 * | 12/2016 | Kim | H04W 76/10 370/331 |
| 2017/0207924 A1 * | 7/2017 | Lee | H04W 52/0216 |
| 2017/0325198 A1 * | 11/2017 | Adachi | H04W 4/06 |
| 2017/0325277 A1 * | 11/2017 | Fujishiro | H04W 4/06 |
| 2017/0366363 A1 * | 12/2017 | Hong | H04L 12/189 |
| 2018/0027578 A1 * | 1/2018 | Xu | H04L 1/00 370/336 |
| 2018/0042033 A1 * | 2/2018 | Xu | H04W 4/06 |
| 2018/0048984 A1 * | 2/2018 | Park | H04W 4/70 |
| 2018/0048985 A1 * | 2/2018 | Park | H04W 4/70 |
| 2018/0049060 A1 * | 2/2018 | Fujishiro | H04W 4/06 |
| 2018/0242278 A1 * | 8/2018 | Xu | H04W 16/02 |
| 2018/0249442 A1 * | 8/2018 | Xu | H04W 4/06 |
| 2018/0249481 A1 * | 8/2018 | Xu | H04L 1/1896 |

FOREIGN PATENT DOCUMENTS

| | | | | |
|---|---|---|---|---|
| EP | 3258713 A1 * | 12/2017 | | H04W 4/06 |
| EP | 3258713 A4 * | 12/2017 | | H04W 4/06 |
| KR | 10-2006-0091184 A | 8/2006 | | |
| KR | 10-2006-0133009 A | 12/2006 | | |
| KR | 10-2013-0059378 A | 6/2013 | | |
| WO | 2013/051832 A2 | 4/2013 | | |
| WO | 2013/151360 A1 | 10/2013 | | |
| WO | WO-2014146615 A1 * | 9/2014 | | H04W 4/08 |
| WO | WO-2018103558 A1 * | 6/2018 | | |

* cited by examiner

METHOD FOR TRANSMITTING AND RECEIVING SINGLE-CELL MULTI-TRANSMISSION DATA AND APPARATUS THEREFOR

CROSS REFERENCE TO RELATED APPLICATIONS

This application is a National Stage Patent Application of PCT International Patent Application No. PCT/KR2015/014479 (filed on Dec. 30, 2015) under 35 U.S.C. § 371, which claims priority to Korean Patent Application Nos. 10-2015-0002930 (filed on Jan. 8, 2015), and 10-2015-0185653 (filed on Dec. 24, 2015), the teachings of which are incorporated herein in their entireties by reference.

TECHNICAL FIELD

The present disclosure relates to transmitting and receiving multi-transmission data in a single cell. More particularly, the present disclosure relates to a method and an apparatus for providing point-to-multipoint transmission within a single cell in a mobile communication network.

BACKGROUND ART $3^{rd}$ generation partnership project (3GPP) Long Term Evolution (LTE) has introduced Group Communication System Enablers (GCSE) to transmit data to a plurality of User Equipments (UEs) for urgent communication, such as a public disaster.

In 3GPP Release 12, a group of UEs uses a Multimedia Broadcast Multicast Service (MBMS) to receive group communication.

The MBMS has been designed to provide media contents for a mobile TV in a large-scale planned area (for example, an MBSFN area). The MBSFN area is a predetermined nonadjustable area. Further, the MBSFN area cannot be dynamically adjusted according to user distribution. MBMS transmission occupies an entire system bandwidth. Furthermore, even if not all radio resources are used within a frequency domain, unicast and multiplexing are not allowed in the same subframe.

As described above, the MBMS occupies the entire system bandwidth and cannot be dynamically adjusted according to the number of groups or traffic load of the groups because the MBMS is static predetermined nonadjustable area. This results in inefficiency of transmission of group communication data from an evolved Node B (eNB) to a plurality of UEs.

DETAILED DESCRIPTION OF THE INVENTION

Technical Problem

The present disclosure made from the above-described background proposes a method and an apparatus for performing dynamic transmission and reception through a PDSCH when transmitting and receiving multi-transmission data to and from a group including a plurality of UEs within a single cell.

Further, the present disclosure proposes a method and an apparatus for transmitting and receiving multi-transmission data through a PDSCH while minimizing group communication service interruption, which occurs in response to movement of a UE from a cell to another cell.

Technical Solution

The present disclosure made to solve the above technical problem provides a method of receiving single-cell multi-transmission data by a UE. The method includes: receiving system information for single-cell multi-transmission in a Primary Cell (PCell); determining whether to transmit a Multimedia Broadcast Multicast Service (MBMS) interest information message; and transmitting the MBMS interest information message, wherein the MBMS interest information message is transmitted when the UE establishes an RRC connection or when interest group communication service information of a previous interest information message, which the UE transmitted lastly, is changed.

The present disclosure provides a method of transmitting single-cell multi-transmission data by an eNB. The method includes: transmitting system information for single-cell multi-transmission in a Primary Cell (PCell); and receiving a Multimedia Broadcast Multicast Service (MBMS) interest information message from a UE, wherein the MBMS interest information message is received when the UE establishes an RRC connection or when interest group communication service information of a previous interest information message, which the UE transmitted lastly, is changed.

The present disclosure provides a UE receiving single-cell multi-transmission data. The UE includes: a receiver configured to receive system information for single-cell multi-transmission in a Primary Cell (PCell); a controller configured to determine whether to transmit a Multimedia Broadcast Multicast Service (MBMS) interest information message; and a transmitter configured to transmit the MBMS interest information message, wherein the controller determines to transmit the MBMS interest information message when the UE establishes an RRC connection or when interest group communication service information of a previous interest information message, which the UE transmitted lastly, is changed.

The present disclosure provides an eNB transmitting single-cell multi-transmission data. The eNB includes: a transmitter configured to transmit system information for single-cell multi-transmission in a Primary Cell (PCell); and a receiver configured to receive a Multimedia Broadcast Multicast Service (MBMS) interest information message from a UE, wherein the MBMS interest information message is received when the UE establishes an RRC connection or when interest group communication service information of a previous interest information message, which the UE transmitted lastly, is changed.

Effects of the Invention

As described above, the present disclosure provides an effect of enabling the efficient use of radio resources by dynamically transmitting and receiving multi-transmission data to a group including a plurality of UEs within a single cell through a PDSCH.

Further, the present disclosure provides an effect of transmitting and receiving multi-transmission data through the PDSCH while minimizing group communication service interruption, which occurs in response to movement of the UE from a cell to another cell.

MODE FOR CARRYING OUT THE INVENTION

Figure 1:
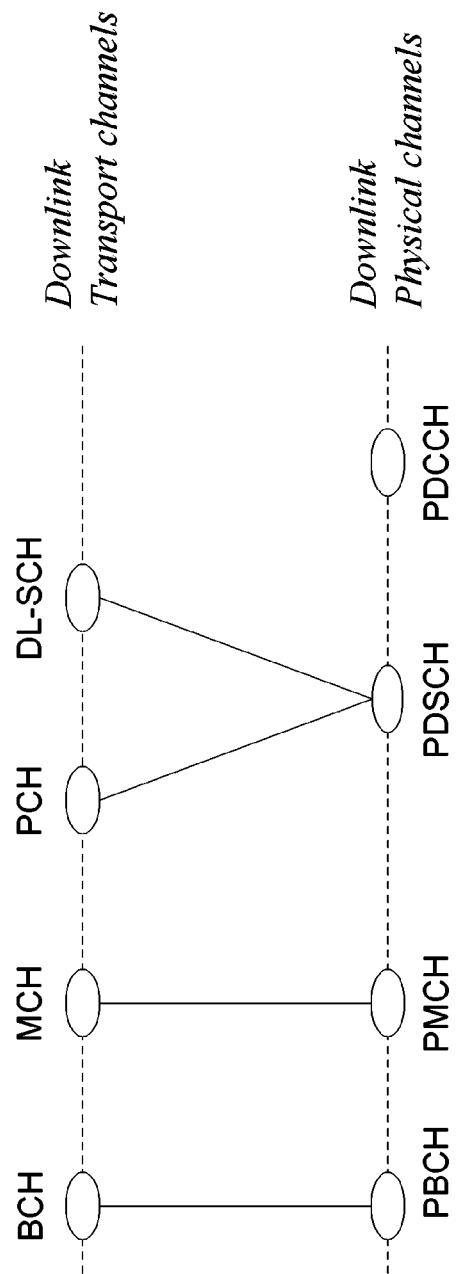
FIG. 1 illustrates mapping between downlink transport channels and downlink physical channels.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a machine type communication (MTC) terminal may refer to a terminal that supports low cost (or low complexity), a terminal that supports coverage enhancement, or the like. In the present specifications, the MTC terminal may refer to a terminal that supports low cost (or low complexity) and coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release 12 that supports the enhanced coverage in comparison with the existing LTE coverage, or supports low power consumption, or may refer to a newly defined Release 13 low cost(or low complexity) UE category/type.

The wireless communication system may be installed in a wide area so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global system for mobile communication (GSM).

A base station or a cell may generally refer to a station where performs communication with a User Equipment (UE). Such a base station or a cell may be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, a base station or a cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways: i) the base station may be a device itself that provides a megacell, a macrocell, a microcell, a picocell, a femtocell, and a small cell in association with a wireless area, or ii) the base station may indicate a wireless area itself. In i), all devices that interact with one another to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications. However, the user equipment and the base station may not be limited to a predetermined term or word. In the specification, the user equipment and the base station are used as two (uplink or downlink) inclusive transceiving subjects to embody the technology and technical concepts described in the specifications, but not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH(Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

The present disclosure relates to a method and an apparatus for transmitting and receiving single-cell multi-transmission data.

A conventional E-UTRAN has a problem in that group UEs should use a static area or a static radio resource configuration in order to receive group communication data (downlink multicast or group cast) through an MBMS. As a method of removing such inefficiency, reception of the same downlink data through a PDSCH in a multicast scheme may be considered, but a detailed procedure through which a plurality of group UEs receive downlink data through the PDSCH has not been provided. Further, a method of receiving downlink group communication data through the PDSCH may be independently generated within each cell and thus cannot guarantee continuity of service when a cell change occurs according to movement of the UE. In order to solve these problems, the present disclosure provides a method and an apparatus for receiving downlink group communication data through the PDSCH. Further, the present disclosure provides a method and an apparatus for receiving group communication data through the PDSCH while minimizing service interruption resulting from movement of an RRC-connected UE from a cell to another cell.

FIG. 1 illustrates mapping between downlink transport channels and downlink physical channels. Referring to FIG. 1, typical PDSCH physical channels may be used only for carrying DL-SCH and PCH transport channels.

Figure 2:
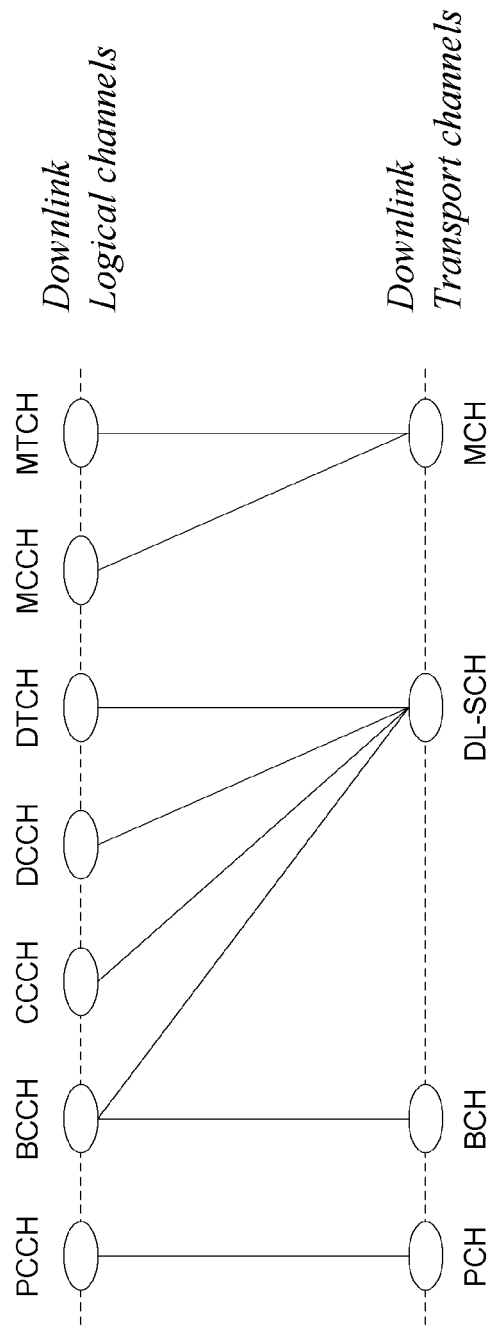
FIG. 2 illustrates mapping between downlink logical channels and downlink transport channels.

FIG. 2 illustrates mapping between downlink logical channels and downlink transport channels. Referring to FIG. 2, a DL-SCH transport channel may be mapped to BCCH, CCCH, DCCH, and DTCH logical channels and transmitted.

The PCCH is used for transmitting paging information and a system information change notification. For example, in order to receive paging at an UE in an idle mode, the UE wakes up at a corresponding paging occasion, detects a P-RNTI transmitted on the PDCCH addressing a paging message, and processes reception of a corresponding downlink paging message transmitted on the PCH.

The BCCH is used for broadcasting system control information. For example, in the BCCH logical channel, a Master Information Block (MIB) is mapped to the BCH and transmitted through the PBCH. In another example, in the BCCH logical channel, a System Information Block (SIB) other than SIB1 is mapped to a system information message (SI message) and transmitted through the DL-SCH. The mapping of the SIB (excepting SIB1) to the system information message is flexible and is indicated by SIB1. The UE should acquire SIB1 in order to know how other SIBs are scheduled. Each SIB may be included within a single SI message, and a single SI message may include a plurality of SIBs having the same period. The SI message is dynamically scheduled. The SI message may be transmitted within a periodic time window called an SI-window. Each SI message is associated with one SI-window, and other SI messages are broadcasted on different SI-windows that do not overlap each other. When SIB1 and the SI message are broadcasted on the DL-SCH, the PDCCH associated with the DL-SCH uses a single SI-RNTI to address SIB1 and all SI messages within one cell. The UE decodes the SI-RNTI on the PDCCH within the SI-window to acquire detailed scheduling of the system information in the corresponding SI-window.

The CCCH is used for transmitting control information connected to random access of non-RRC-connected UEs. Since MAC HARQ retransmission may be performed on an RRC message on the CCCH, the RRC message may be received in duplicate.

The DCCH is a point-to-point channel used for transmitting dedicated control information of RRC-connected UEs. Further, the DTCH is a UE-dedicated point-to-point channel used for transmitting user information.

The UE receives downlink assignment through the masked PDCCH with the C-RNTI of the UE. Downlink assignment indicates HARQ information and information on radio resources on the assigned PDSCH.

Figure 3:
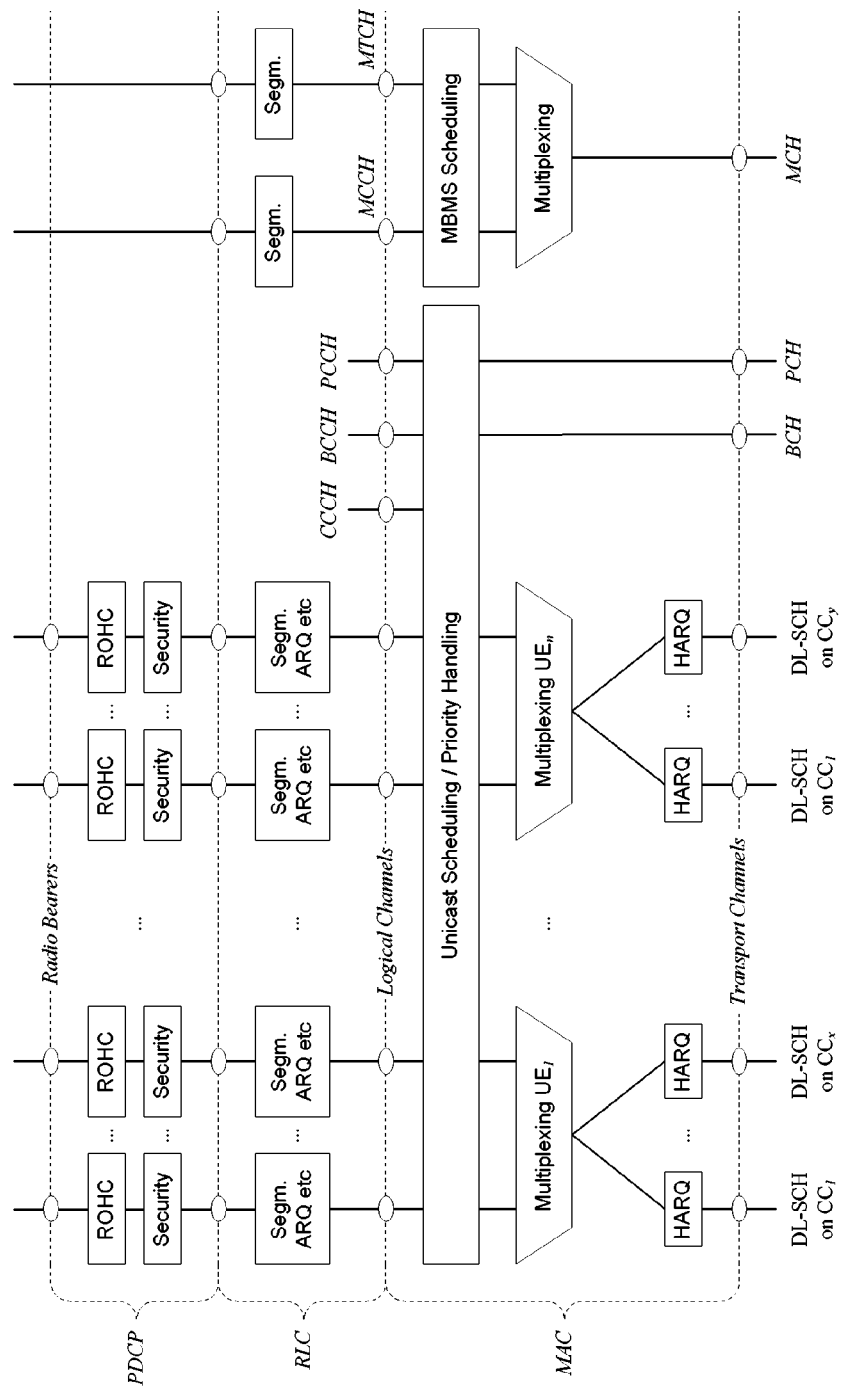
FIG. 3 illustrates a layer 2 structure for downlink (DL) with carrier aggregation configuration.

FIG. 3 illustrates a layer 2 structure for downlink (DL) with Carrier Aggregation (CA) configuration.

As described, the PDSCH may be used for receiving dedicated information of a particular UE and common information of a particular UE. To this end, a UE-specific identifier (for example, C-RNTI) for the corresponding UE is needed. Further, the PDSCH may be used for receiving paging information and common information for all UEs or group UEs. Thus, a common group identifier (for example, P-RNTI or SI-RNTI) is needed. In E-TURAN, FFFE is used as the P-RNTI and FFFF is used as the SI-RNTI.

In this specification, data transmission through PDSCH radio resources shared by UEs included in a particular group within one cell is referred to as single-cell multi-transmission, and downlink multicast, group cast, or group communication data transmitted through the PDSCH radio resources shared by the UEs included in the particular group within one cell is referred to as single-cell multi-transmission data. A communication type in which data is transmitted and received through single-cell multi-transmission is referred to as group communication.

Further, a particular group identifier (group-specific RNTI) allocated to a corresponding particular group to transmit single-cell multi-transmission data is referred to as group identifier information (Group-RNTI: G-RNTI). A service provided to UEs through group communication is referred to as a group communication service, and information for identifying each group communication service, each group communication session, or each group bearer is referred to as group communication service identification information (Temporary Mobile Group Identity: TMGI). Further, a UE interested in group communication, a UE interested in group communication through single-cell multi-transmission, or a UE capable of performing single-cell multi-transmission is collectively referred to as a UE interested in group communication.

Meanwhile, the UE requires information for identifying a single-cell multi-transmission control message transmitted by the eNB, the information being referred to as single-cell identification information (Single Cell-RNTI: SC-RNTI), and the UE may identify single-cell multi-transmission control information based on the SC-RNTI. The single-cell multi-transmission control message includes control information for single-cell multi-transmission.

Each term described above is only for convenience of understanding and is not limited to the name thereof.

The UE interested in group communication may know group communication service identification information (TMGI) for identifying a particular group communication service through an application server (for example, a GCS AS or a BM-SC). Alternatively, the TMGI for identifying particular group communication services, in which the UE is interested, may be configured in advance in the UE.

For downlink transmission of a group communication service, one of the MBMS, single-cell multi-transmission, and the unicast bearer may be used. Further, for uplink transmission, the unicast bearer may be used.

When the MBMS is used, an MBMS bearer pre-arranged between the Broadcast/Multicast Service Centre (BM-SC) and eNBs may be used for a group communication service/session/bearer setup. Alternatively, the MBMS bearer may be established and used between the BM-SC and eNBs through an Active MBMS Bearer procedure at the request of the Group Communication Service Application Server (GCS AS). One or more of a TMGI for identifying a downlink MBMS bearer service for group communication, a session ID (MBMS Session Identity) for identifying each MBMS session, MBSFN area identification information, and identification information for identifying a downlink service/session/bearer of a group communication service/session/bearer may be provisioned to the UE by an Evolved Packet System (EPS) entity (for example, GCS AS, IMS, PCRF, other EPS entities) controlling group communication which is allocated by the BM-SC, the GCS AS, or another EPS, or an EPS entity controlling registration (or authentication or identification). In order to receive downlink transmission for group communication using the MBMS, the UE may register the information in the GCS application server (GCS AS), the EPS entity controlling group communication, or the EPS entity controlling registration (or authentication or identification). In another method, a TMGI for identifying a downlink MBMS bearer service for group communication, a session ID (MBMS Session Identity) for identifying each MBMS session, MBSFN area identification information, or group identifier information for group communication may be pre-configured in the UE. When the GCS AS or the EPS entity controlling the group communication determines to provide downlink transmission for the group communication through the MBMS in particular cells, the GCS AS, the EPS entity controlling the group communication, or the EPS entity controlling the registration (or authentication or identification) may start an MBMS session by eNBs through the BM-SC.

When single-cell multi-transmission is used, the eNB allocates the G-RNTI to provide a particular group communication service through the single-cell multi-transmission. The G-RNTI may be associated with the TMGI. Alternatively, the G-RNTI may be associated with the TMGI and/or the MBMS session ID. Alternatively, the G-RNTI may be associated with a downlink service of the group communication service. Alternatively, the G-RNTI may be associated with identification information for identifying the downlink service/session/bearer of the group communication service/session/bearer.

Figure 4:
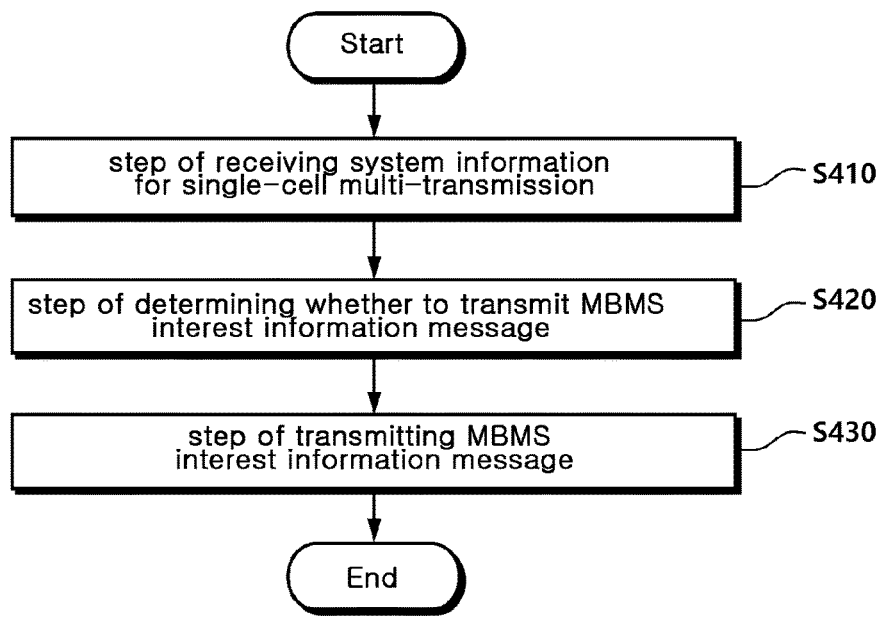
FIG. 4 illustrates an operation of a user equipment (UE) according to an embodiment of the present disclosure.

FIG. 4 illustrates operations of a UE according to an embodiment of the present disclosure.

A method of receiving single-cell multi-transmission data by a UE according to an embodiment of the present disclosure include receiving system information for single-cell multi-transmission in a Primary Cell (PCell), determining whether to transmit a Multimedia Broadcast Multicast Service (MBMS) interest information message, and transmitting the MBMS interest information message.

Referring to FIG. 4, the UE may perform operations for receiving system information for single-cell multi-transmission in the Primary Cell (PCell) in S410. For example, the eNB may transmit system information for single-cell multi-transmission through the PCell configured in the UE, and the UE may receive the system information. For example, the eNB may broadcast information related to the single-cell multi-transmission through the system information. For example, the eNB may broadcast a G-RNTI through the system information. Alternatively, the eNB may broadcast a TMGI and a G-RNTI associated with the TMGI through the system information. Alternatively, the eNB may broadcast identification information for identifying a downlink service/session/bearer of a group communication service/session/bearer and a G-RNTI associated with the identification information through the system information. In another example, the eNB may broadcast information for receiving single-cell multi-transmission control information including the G-RNTI through the system information. Alternatively, the eNB may broadcast information for receiving single-cell multi-transmission control information including the TMGI and the G-RNTI associated with the TMGI through the system information. Alternatively, the eNB may broadcast information for receiving single-cell multi-transmission control information including the identification information for identifying the downlink service/session/bearer of the group communication service/session/bearer and the G-RNTI associated with the identification information through the system information. Accordingly, the UE may recognize group communication based on the group identifier information (G-RNTI) for the group communication.

Further, the UE may perform operations for determining whether to transmit the Multimedia Broadcast Multicast Service (MBMS) interest information message in S420. For example, when an RRC connection is configured, the UE may determine transmission of the MBMS interest information message. In another example, when interest group communication service information of a previous interest information message that was lastly or most recently transmitted is changed, the UE may determine to transmit the MBMS interest information message. The MBMS interest information message may include information on the group communication service in which the UE is interested. For example, the MBMS interest information message may include a list of group communication services in which the UE is interested. For example, the MBMS interest information message may include at least one piece of group communication service identification information (TMGI).

Accordingly, when the UE makes an RRC connection with the corresponding cell or when the list of group communication services of interest that was previously transmitted to the eNB is changed, the UE may determine to transmit the MBMS interest information message.

Further, the UE may perform operations for transmitting the MBMS interest information message in S430. When transmission of the MBMS interest information message is decided, the UE may transmit the MBMS interest information message to the eNB. The MBMS interest information message may be inserted into a new field of the existing RRC message, such as an MBMSInterestIndication message or a UE assistance message and transmitted. Alternatively, the MBMS interest information message may be transmitted through a newly defined RRC message.

Through the MBMS interest information message received from one or more UEs, the eNB may control group communication transmission through single-cell multi-transmission. For example, the eNB may initiate or terminate the single-cell multi-transmission based on information included in the MBMS interest information message. In another example, the eNB may trigger an active MBMS bearer procedure through a GCS AS based on the information included in the MBMS interest information message. In another example, the eNB may trigger initialization of an MBMS service/session/bearer through a BM-SC based on the MBMS interest information message. In another example, the eNB may trigger initialization of a group communication service/session/bearer through BM-SC based on the MBMS interest information message. In another example, the eNB may select a target cell that provides single-cell multi-transmission based on the MBMS interest message of the UE.

As described above, the UE of the present disclosure may receive system information for single-cell multi-transmission and transmit the MBMS interest information message including information on the group communication services in which the UE is interested to the eNB. Accordingly, the eNB may control single-cell multi-transmission for the UE and may identify whether there is a UE performing single-cell multi-transmission, the number of UEs, and traffic information. In order to dynamically allocate single-cell multi-transmission data through the PDSCH, it is very important for the eNB to identify the above-described information. Accordingly, the embodiments of present disclosure provide detailed operations of the UE and the eNB required for dynamically transmitting single-cell multi-transmission data to a particular group corresponding to the eNB through PDSCH radio resources.

Figure 5:
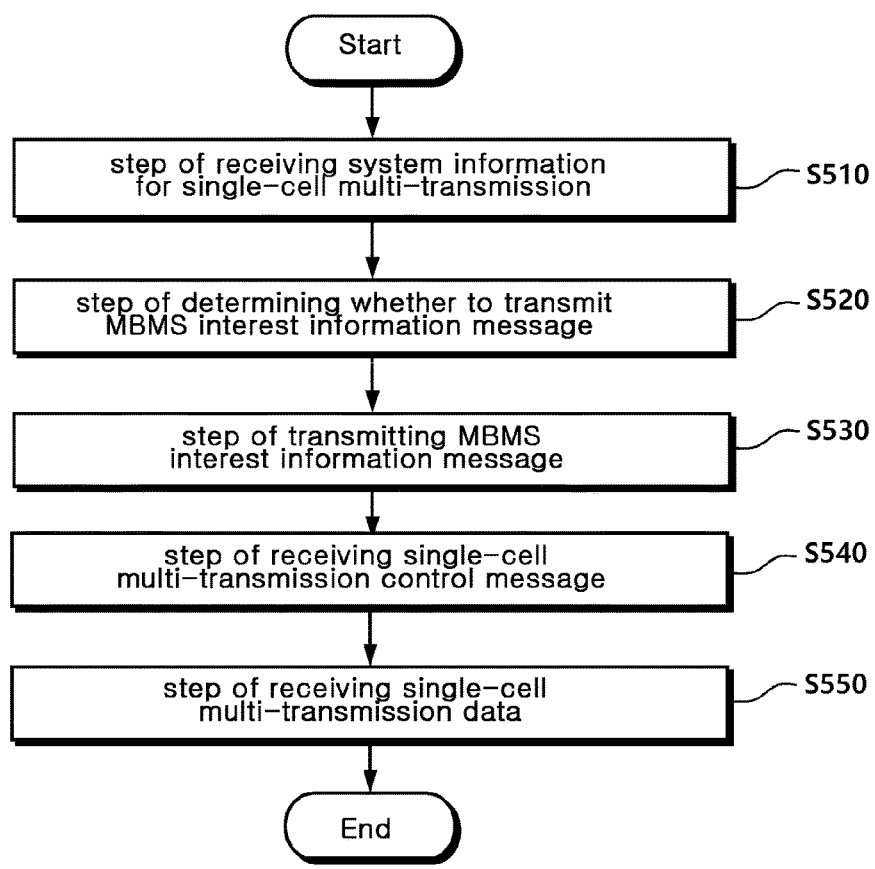
FIG. 5 illustrates an operation of a user equipment (UE) according to another embodiment of the present disclosure.

Meanwhile, FIG. 5 illustrates the detailed operation of the UE for receiving single-cell multi-transmission data through PDSCH radio resources.

FIG. 5 illustrates operations of an UE according to another embodiment of the present disclosure.

In accordance with another embodiment, the UE may perform operations of receiving a single-cell multi-transmission control message based on single-cell identification information (Single Cell RNTI: SC-RNTI) for identifying single-cell multi-transmission control information and receiving single-cell multi-transmission data based on a group identifier information (Group-RNTI: G-RNTI).

Referring to FIG. 5, similar to the description with reference to steps S410 to S430, the UE may receive system information for single-cell multi-transmission in a primary cell in S510, determine whether to transmit an MBMS interest information message in S520, and transmit the MBMS interest information message in S530. Accordingly, the UE may transmit information on group communication services in which the UE is currently interested to the eNB.

Thereafter, the UE may receive a single-cell multi-transmission control message based on single-cell identification information (Single Cell-RNTI: SC-RNTI) for identifying single-cell multi-transmission control information in S540. The UE is required to receive the single-cell multi-transmission control message in order to receive single-cell multi-transmission data received through PDSCH radio resources. The UE may recognize that the received message is a single-cell multi-transmission control message including the single-cell multi-transmission control information based on the SC-RNTI.

For example, the single-cell multi-transmission control message may include at least one piece of group communication service identification information (TMGI) and group identifier information (G-RNTI). Meanwhile, the G-RNTI may be set to be associated with the group communication service identification information. Accordingly, the UE may identify the group communication service identification information or the group identifier information.

Further, the UE may receive single-cell multi-transmission data through the group identifier information (G-RNTI) in S550. For example, the UE may receive single-cell multi-transmission data through PDSCH radio resources. Other UEs belonging to the same group as the corresponding UE may receive single-cell multi-transmission data through shared PDSCH radio resources, and the UE may receive scheduling information for the PDSCH through a PDCCH area in order to receive the single-cell multi-transmission data through the PDSCH radio resources. Meanwhile, the UE may identify whether the corresponding single-cell multi-transmission data is for group communication services in which the UE is interested based on the allocated G-RNTI.

The single-cell multi-transmission control message and the single-cell multi-transmission data may be scheduled through the PDCCH. For example, scheduling information of the single-cell multi-transmission control message and the single-cell multi-transmission data may be identified through the PDCCH area. Specifically, the UE may identify and receive the scheduling information of the single-cell multi-transmission control message through indication information of the PDCCH area. Further, the UE may identify and receive the scheduling information for the PDSCH radio resources of the single-cell multi-transmission data through indication information of the PDCCH area.

Figure 6:
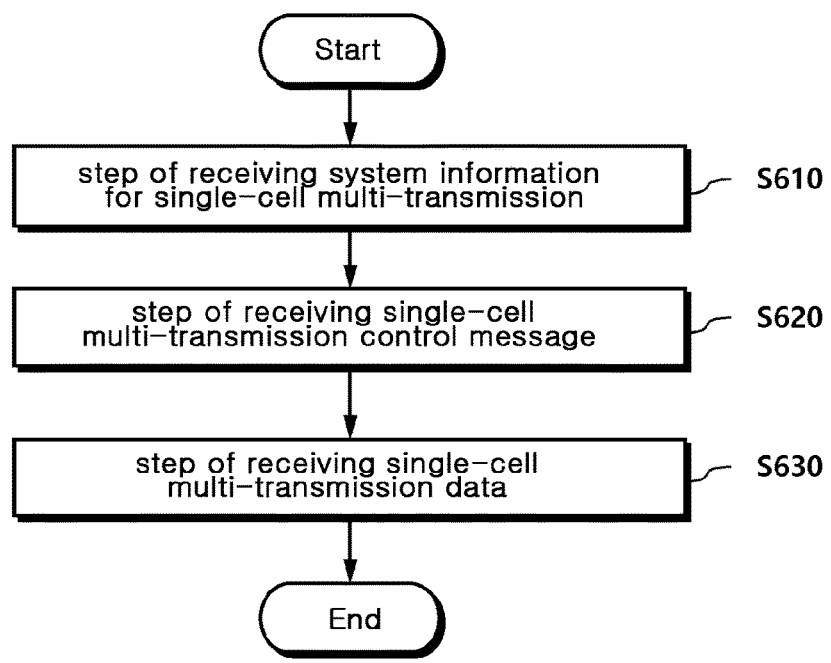
FIG. 6 illustrates an operation of a user equipment (UE) according to still another embodiment of the present disclosure.

FIG. 6 illustrates operations of an UE according to still another embodiment of the present disclosure.

In accordance with still another embodiment, the UE may perform operations of receiving system information for single-cell multi-transmission in a primary cell, receiving a single-cell multi-transmission control message based on single-cell identification information (Single Cell RNTI: SC-RNTI) for identifying single-cell multi-transmission control information, and receiving single-cell multi-transmission data based on a group identifier information (Group-RNTI: G-RNTI).

Referring to FIG. 6, the UE may perform operation of receiving system information for single-cell multi-transmission in a primary cell in S610. As described above, the eNB may transmit the system information for the single-cell multi-transmission through the PCell configured in the UE, and the UE may receive the system information. For example, the eNB may broadcast information related to the single-cell multi-transmission through the system information. For example, the eNB may broadcast a G-RNTI through the system information. Alternatively, the eNB may broadcast a TMGI and a G-RNTI associated with the TMGI through the system information. Alternatively, the eNB may broadcast identification information for identifying a downlink service/session/bearer of a group communication service/session/bearer and a G-RNTI associated with the identification information through the system information. In another example, the eNB may broadcast information for receiving single-cell multi-transmission control information including the G-RNTI through the system information. Alternatively, the eNB may broadcast information for receiving single-cell multi-transmission control information including the TMGI and the G-RNTI associated with the TMGI through the system information. Alternatively, the eNB may broadcast information for receiving single-cell multi-transmission control information including identification information for identifying a downlink service/session/bearer of a group communication service/session/bearer through the system information. Accordingly, the UE may recognize a group communication service based on the group identifier information (G-RNTI) according to the group communication service.

Further, the UE may perform operations of receiving a single-cell multi-transmission control message based on single-cell identification information (SC-RNTI) for identifying single-cell multi-transmission control information in S620. The UE is required to receive a single-cell multi-transmission control message to receive single-cell multi-transmission data which is received through PDSCH radio resources. The UE may recognize that the received message is the single-cell multi-transmission control message including the single-cell multi-transmission control information based on the SC-RNTI. For example, the single-cell multi-transmission control message may include at least one piece of group communication service identification information (TMGI) and group identifier information (G-RNTI). Meanwhile, the G-RNTI may be set to be associated with the group communication service identification information. Accordingly, the UE may identify group communication service identification information or group identifier information associated with the corresponding single-cell multi-transmission control message.

Further, the UE may perform operations of receiving single-cell multi-transmission data through the group identifier information (Group-RNTI: G-RNTI) in S630. For example, the UE may receive single-cell multi-transmission data through PDSCH radio resources. Other UEs belonging to the same group as the corresponding UE may receive single-cell multi-transmission data through shared PDSCH radio resources, and the UE may receive scheduling information for the PDSCH through a PDCCH area in order to receive the single-cell multi-transmission data through the PDSCH radio resources. Meanwhile, the UE may identify whether the corresponding single-cell multi-transmission data is for group communication services in which the UE is interested based on the allocated G-RNTI.

The single-cell multi-transmission control message and the single-cell multi-transmission data may be scheduled through the PDCCH. For example, scheduling information of the single-cell multi-transmission control message and the single-cell multi-transmission data may be identified through the PDCCH area. Specifically, the UE may identify and receive the scheduling information of the single-cell multi-transmission control message through indication information of the PDCCH area. Further, the UE may identify and receive the scheduling information for the PDSCH radio resources of the single-cell multi-transmission data through indication information of the PDCCH area.

The detailed operation of the UE according to each embodiment described above will be described again through various scenarios.

The eNB may broadcast information related to the single-cell multi-transmission through the system information. For example, the eNB may broadcast the G-RNTI. In another example, the eNB may broadcast the TMGI and the G-RNTI associated with the TMGI. In another example, the eNB may broadcast identification information for identifying the downlink service/session/bearer of the group communication service/session/bearer and the G-RNTI associated with the identification information. In another example, the eNB may broadcast information for receiving single-cell multi-transmission control information including the G-RNTI. In another example, the eNB may broadcast information for receiving single-cell multi-transmission control information including the TMGI and the G-RNTI associated with the TMGI. In another example, the eNB may broadcast information for receiving single-cell multi-transmission control information including identification information for identifying the downlink service/session/bearer of the group communication service/session/bearer and the G-RNTI associated with the identification information. Accordingly, the UE interested in the corresponding group communication may know the G-RNTI of the corresponding group communication service.

When the UE interested in the group communication that receives (or is receiving) downlink transmission of particular group communication transmitted through single-cell multi-transmission moves from a cell to another cell (moves from an eNB to another eNB or moves to another eNB cell), it is necessary to provide service continuity in order to reduce service interruptions. A method of providing such service continuity will be described hereinafter based on each scenario.

Scenario 1: Moving from Cell Supporting Single-Cell Multi-Transmission to Cell Not Supporting Single-Cell Multi-Transmission While the UE is in a source cell, the UE may identify whether a target neighbor cell to move supports single-cell multi-transmission based on system information related to single-cell multi-transmission of the neighbor cell, control information associated with the system information related to the single-cell multi-transmission, or control information for identifying whether the neighbor cell performs the single-cell multi-transmission.

When the target neighbor cell does not support single-cell multi-transmission, the UE may make a request for communication service via unicast while receiving the service through the single-cell multi-transmission in the source cell. The RRC-connected UE may directly make the request for the service through unicast through GCS AS. Through the GCS AS, the RRC idle UE may make the request for the service through unicast after establishing the RRC connection.

The end-to-end delay for media delivery using a unicast bearer is at the level of about 40 ms. However, the end-to-end delay for media delivery through an MBMS MRB is at a level of about 160 ms. Accordingly, in order to provide service continuity, if the target neighbor cell does not support single-cell multi-transmission, the UE may first make a request for service through unicast even when the corresponding neighbor cell supports MBMS (or group communication through the MBMS or an MBSFN providing the same service). After moving to the target cell, the UE may receive group communication through the MBMS.

The UE may experience short service interruption while moving from a single-cell multi-transmission cell to a cell not supporting single-cell multi-transmission. As an avoidance or mitigation method, when the UE receives single-cell multi-transmission, the source cell (or source eNB) may forward data transmitted via the BM-SC (or the GCS AS or a predetermined group communication data transport entity) to the target cell (target eNB).

For example, when the target cell/eNB receives group communication data transmitted via the BM-SC (or the GCS AS or the predetermined group communication data transport entity) through the source cell/eNB, the target eNB may transmit the group communication data to the UE. For example, the target eNB may transmit the corresponding data through single-cell multi-transmission. To this end, the G-RNTI may be received from the source eNB through the handover preparation message and used. During the preparation for handover, a tunnel for forwarding of the corresponding data may be established. In another example, the target eNB may transmit corresponding data through a data radio bearer of the corresponding UE. During the preparation for handover, a tunnel for forwarding of the corresponding data may be established.

Scenario 2: Moving from Single-Cell Multi-Transmission Transmission Cell to Single-Cell Multi-Transmission Cell While the UE is in a source cell, the UE may identify whether a neighbor cell, as a target cell to move, supports single-cell multi-transmission based on system information related to the single-cell multi-transmission of the neighbor cell, control information associated with the system information related to the single-cell multi-transmission, or control information for identifying whether the neighbor cell supports single-cell multi-transmission.

Hereinafter, various embodiments for providing service continuity to an RRC-connected UE will be described in detail.

1) transmit MBMS interest information including single-cell multi-transmission group identifier information In terms of a network, it may be efficient to hand over the RRC-connected UE to a cell through single-cell multi-transmission.

The eNB may not know that the UE is receiving the group communication service through single-cell multi-transmission. For example, the single-cell multi-transmission does not have HARQ, like the MBMS, so HARQ feedback or a CSI report may not be received. In another example, if feedback is performed without a UE distinction even though HARQ feedback or a CSI report for single-cell multi-transmission is allowed, the single-cell multi-transmission reception state of a particular UE may not be identified.

In order to solve this problem, the PCell with which the UE made the RRC connection may transmit system information for single-cell multi-transmission. When the system information for single-cell multi-transmission is received in the PCell, the UE may indicate interest in the single-cell multi-transmission.

As described above, the UE may transmit a MBMS interest information message to the eNB in order to indicate interest in single-cell multi-transmission. For example, when establishing the RRC connection with the corresponding eNB, the UE interested in group communication may transmit an MBMS interest information message. In another example, when entering or leaving a current single-cell multi-transmission cell, the UE interested in group communication may transmit the MBMS interest information message. In another example, when a session starts or ends, the UE interested in group communication may transmit the MBMS interest information message. In further another example, when system information related to single-cell multi-transmission is changed, the UE interested in group communication may transmit the MBMS interest information message. In still another example, when an interest group communication service to be received through single-cell multi-transmission is changed, the UE interested in group communication may transmit the MBMS interest information message. In yet another example, when a TMGI to be received through single-cell multi-transmission is changed, the UE interested in group communication may transmit the MBMS interest information message. In further still another example, when a group communication service different from a previous interest information message, which the UE transmitted lastly, is received, the UE interested in group communication may transmit the MBMS interest information message.

As described above, single-cell multi-transmission may be independently performed even by cells/eNBs using the same frequency. Further/alternatively, a single-cell multi-transmission area may be configured regardless of the frequency.

The UE may insert at least one TMGI into the MBMS interest information message. The TMGI is identification information of a group communication service, in which the UE is interested, and the UE may transmit group communication services, in which the UE is interested, in a list form. Alternatively, the UE may insert a G-RNTI into the MBMS interest information message. Alternatively, the UE may insert identification information for identifying a corresponding group communication service/session/bearer, received through system information or pre-configured in the UE, into the MBMS interest information message. In another example of the MBMS interest information message, the UE may include relative priority information of a group communication service/session/bearer. Alternatively, in another example of the MBMS interest information message, the UE may include absolute priority information of a group communication service/session/bearer.

The MBMS interest information message may be provided through a new field of the existing RRC message such as an "MBMSlnterestIndication message" or a "UE assistance message", or may be provided through a new RRC message.

The eNB may control group communication transmission through single-cell multi-transmission based on the MBMS interest information message received from UEs. For example, single-cell multi-transmission may be initiated or terminated. In another example, the eNB may trigger activation of an MBMS Bearer procedure through a GCS AS. In another example, the eNB may trigger initialization of an MBMS service/session/bearer through a BM-SC. In still another example, the eNB may trigger initialization of a group communication service/session/bearer through the BM-SC. In yet another example, the eNB may select a target cell that provides single-cell multi-transmission based on the MBMS interest message of the UE.

2) transmit MBMS interest information message of UE to target eNB during handover When the RRC-connected UE receives group communication through single-cell multi-transmission, handover may be performed in response to movement of the UE. During preparation for handover, a source eNB may transmit an MBMS interest information message received from the UE to a target eNB if possible.

After the handover, the UE may read system information related to the single-cell multi-transmission before updating the MBMS interest information message.

When the source cell has not provided the system information related to the single-cell multi-transmission or when the UE, having not performed the reception through the single-cell multi-transmission, is handed over, the UE may indicate the MBMS interest information message to the eNB after the handover.

The MBMS interest information message may be inserted into AS-Context information of a "HandoverPreparationInformation message" and transmitted.

When the target cell/eNB, having received the MBMS interest information message including group communication service information, in which the UE is interested from the source cell/eNB, does not support the single-cell multi-transmission or does not provide the group communication service in which the UE is interested, the target cell/eNB may transmit information thereon to the source cell/eNB.

For example, when the target cell/eNB does not support single-cell multi-transmission, the target eNB may insert information indicating non-support of the single-cell multi-transmission into a handover response X2 message or a handoverCommand Inter-node RRC message.

In another example, when the target cell/eNB receives the above-described MBMS interest information message via the source cell/eNB, if the target cell/eNB does not support the single-cell multi-transmission or does not provide the group communication service in which the UE is interested through single-cell multi-transmission, the target eNB may transmit information on non-support to the source eNB through the handover response X2 message.

In another example, the target cell/eNB may insert information for indicating non-support or information for indicating a UE's request for a service through unicast to a GCS AS into the "handoverCommand Inter-node RRC message" and transmit the "handoverCommand Inter-node RRC message" to the UE via the source eNB.

Meanwhile, the source cell/eNB may not determine the handover to the target eNB that does not support the single-cell multi-transmission or does not provide the group communication service in which the UE is interested. Alternatively, the UE may make a request for a service through unicast to the GCS AS.

3) group communication data forwarding

The source cell/eNB may forward data transmitted via the BM-SC (the GCS AS or a predetermined group communication data transport entity) to the target cell/eNB.

For example, when the target cell/eNB receives the above-described MBMS interest information message via the source cell/eNB, the source eNB may forward corresponding group communication data to the target eNB. Alternatively, when the target cell/eNB does not support the single-cell multi-transmission, the source eNB may forward corresponding group communication data to the target eNB. Alternatively, when the target cell/eNB does not provide the group communication service in which UE is interested through the single-cell multi-transmission, the source eNB may forward corresponding group communication data to the target eNB. Alternatively, when the target cell/eNB receives information on non-provision of the corresponding interest group communication service through the single-cell multi-transmission from the target cell/eNB, the source eNB may forward corresponding group communication data to the target eNB. Alternatively, when the target cell/eNB receives group communication data transmitted via the BM-SC (or the GCS AS or a predetermined group communication data transport entity) through the source cell/eNB, the source eNB may forward corresponding group communication data to the target eNB.

The target cell/eNB may transmit the group communication data, forwarded via the source cell/eNB, to the UE. For example, the target cell/eNB may transmit corresponding data through the single-cell multi-transmission. At this time, the G-RNTI may be received from the source eNB through the above-described handover preparation message and used. During the preparation for handover, a tunnel for forwarding of the corresponding data may be established. In another example, the target eNB may transmit corresponding data through a data radio bearer of the corresponding UE. During the preparation for handover, a tunnel for forwarding of the corresponding data may be established.

Meanwhile, when the target cell/eNB receives the above-described MBMS interest information message via the source cell/eNB, the UE may make a request for and receive the group communication service/session/bearer data through the BM-SC or the GCS AS. Alternatively, when the target cell/eNB does not support the single-cell multi-transmission, the UE may make the request for and receive the group communication service/session/bearer data through the BM-SC or the GCS AS. Alternatively, when the target cell/eNB does not provide the corresponding interest group communication through the single-cell multi-transmission, the UE may make the request for and receive the group communication service/session/bearer data through the BM-SC or the GCS AS.

Further, in the data forwarding or the handover, the source eNB may not forward a downlink RLC SDU which has been completely transmitted by the source cell to the target eNB. Alternatively, non-transmitted RLC SDUs may not be transmitted either. Alternatively, the source eNB may forward arriving fresh downlink data through the BM-SC or the GCS AS.

Meanwhile, in order to provide service continuity, when a neighbor cell, to which the UE moves, does not support single-cell multi-transmission based on information related to the single-cell multi-transmission of the neighbor cells/eNBs or system information related to the single-cell multi-transmission to be broadcasted through system information within the cell while the UE is in the source cell, the UE may make a request for a service through unicast to the GCS AS. To this end, information related to single-cell multi-transmission for a particular group communication service/session/bearer of the neighbor cell/eNB may be provided through X2 signaling (for example, X2 Setup and eNB Configuration Update procedure) and/or OAM (Operation, Administration and Maintenance). The eNB, having received the system information related to the single-cell multi-transmission of the neighbor cell, control information associated with the system information related to the single-cell multi-transmission, or control information for identifying whether the neighbor cell supports the single-cell multi-transmission, may broadcast information related to the single-cell multi-transmission of neighbor cells/eNBs through the system information within the cell or control information associated with the system information within the cell, so as to support service continuity of the UE receiving data through single-cell multi-transmission. For example, the information related to the single-cell multi-transmission of the neighbor cells/eNBs, the information related to the single-cell multi-transmission to be broadcasted through system information within the cell, or the information related to the single-cell multi-transmission to be broadcasted through the control information associated with the system information within the cell may include one or more pieces of cell identification information, group identifier information (TMGI), G-RNTI, and identification information for identifying the group communication service/session/bearer.

The UE interested in group communication may avoid reading the system information or the control information (for example, single-cell control information) related to single-cell multi-transmission in neighbor cells or neighbor frequencies through the information. Alternatively, the UE interested in group communication may be aware of what group communication service is provided through the information. For example, the UE interested in group communication or the UE receiving group communication through single-cell multi-transmission may know physical layer cell identification information (PhysCellId) of the neighbor cell through a cell search. For example, the physical layer cell identification information may have one value from 0 to 503 in each cell. Accordingly, when the serving cell broadcasts information related to the single-cell multi-transmission of neighbor cells/eNBs through system information within the cell, the UE may identify whether the neighbor cell supports the single-cell multi-transmission based on the information related to the single-cell multi-transmission. Therefore, the UE may avoid unnecessarily reading system information related to the single-cell multi-transmission of the neighbor cell.

For example, the eNB may broadcast mapping information of single-cell multi-transmission (for example, TMGI or G-RNTI) for a particular group communication service in the serving cell and cell identification information (for example, physical layer cell identification information) of the neighbor cell that provides the single-cell multi-transmission. In this case, the UE may know whether the corresponding neighbor cell provides the single-cell multi-transmission for the particular group communication service through the physical layer cell identification information acquired through the cell search process for the neighbor cell.

As described above, according to the present disclosure, the UE may identify whether the serving cell or the neighbor cell supports single-cell multi-transmission based on system information for single-cell multi-transmission. Alternatively, the UE may receive the system information for the single-cell multi-transmission and identify information on a single-cell multi-transmission group communication service that the serving cell or the neighbor cell may provide.

The UE may transmit information on group communication services in which the UE is interested to the eNB by transmitting the MBMS interest information message, and the UE may receive single-cell multi-transmission data for group communication services in which the UE is interested through PDSCH radio resources by receiving a single-cell multi-transmission control message.

Hereinafter, an UE for receiving single-cell multi-transmission data for interested group communication services through PDSCH radio resources will be described.

The UE may receive a single-cell multi-transmission control message in order to receive single-cell multi-transmission data. The single-cell multi-transmission control message may include at least one of group communication service identification information (TMGI) and group identifier information (G-RNTI). In this case, the group identifier information may be set to be associated with the group communication service identification information. Further, the UE may receive single-cell multi-transmission data transmitted through PDSCH radio resources based on the group identifier information (G-RNTI).

The G-RNTI may be carried on the PDCCH.

For example, the G-RNTI may be used with one of FFF4 to FFFC, corresponding to currently reserved RNTI values. In another example, the G-RNTI may be used with one of 0001-003C or 003D-FFF3. In still another example, when the G-RNTI is used with a value allocated from a plurality of values, the eNB may allocate or select the G-RNTI through coordination with the BM-SC or the GCS AS if the G-RNTI is allocated to provide a particular group communication service/session/bearer. Accordingly, there may be an effect of allocating the G-RNTI such that the G-RNTI for the particular group communication service/session/bearer does not collide in another eNB or another cell. In yet another example, when the G-RNTI is used with a value allocated from a plurality of values, each eNB may independently allocate the G-RNTI. If a collision occurs, each eNB may allocate and select the G-RNTI through coordination when allocating the G-RNTI to provide a particular group communication service/session/bearer. In further another example, when the G-RNTI is used with a value allocated from a plurality of values, the eNB may allocate or select the G-RNTI through coordination between eNBs if the G-RNTI is allocated to provide a particular group communication service/session/bearer. X2 signaling therefor may be established. In further still another example, when the G-RNTI is used with a value allocated from a plurality of values, the eNB may calculate and allocate the G-RNTI based on an associated Temporary Mobile Group Identity (TMGI) if the G-RNTI is allocated to provide a particular group communication service/session/bearer. In yet another example, the UE may calculate and use the G-RNTI based on a TMGI received through an application server (for example, the GCS AS or the BM-SC) or configured in advance. In another example, when the G-RNTI is used with a value allocated from a plurality of values, the eNB may calculate and allocate the G-RNTI based on identification information for identifying an associated particular group communication service/session/bearer if the G-RNTI is allocated to provide the particular group communication service/session/bearer. In another example, the UE may calculate and use the G-RNTI based on identification information for identifying a particular group communication service/session/bearer received through an application server (for example, the GCS AS or the BM-SC) or configured in advance. In another example, when the G-RNTI is used with a value allocated from a plurality of values, the eNB may designate one RNTI (for example, SC-RNTI) to broadcast single-cell multi-transmission control information including the G-RNTI of a particular group communication service/session/bearer to the UE. The UE may receive single-cell multi-transmission control information including the G-RNTI of the particular group communication service/session/bearer through the designated single-cell identification information (for example, SC-RNTI). The UE may be aware of the G-RNTI associated with the particular group communication service/session/ bearer through the single-cell multi-transmission control information indicated by the single-cell identification information (for example, SC-RNTI) on the PDCCH. That is, the UE may receive scheduling information of the single-cell multi-transmission control information through the PDCCH masked with the single-cell identification information (for example, SC-RNTI). Accordingly, the UE may receive single-cell multi-transmission control information including the G-RNTI associated with the particular group communication service/session/bearer.

When the particular group communication service is generated/changed/released, the eNB may change only the single-cell multi-transmission control information and may broadcast the changed single-cell multi-transmission control information to the UE. Accordingly, when the particular group communication service is generated/changed/released, it is not required to change system information.

The UE may receive scheduling information of group communication data through the PDCCH masked with the G-RNTI for the interested group communication. The scheduling information may indicate information on radio resources on the allocated PDSCH.

For example, the scheduling information may use downlink scheduling allocation. For example, scheduling information may use one of DCI formats 1/1A/1B/1C/1D/2/2A/ 2B/2C used for the downlink scheduling allocation. In another example, DCI format 1C used for a response to random access, paging, and transmission of system information, or a new improved format may be used. DCI format 1C is used for special-purpose compact allocation and supports only QPSK. Accordingly, the new improved format may be used. In another example, the G-RNTI may be carried on the PDCCH. The UE may receive a scheduling information message for single-cell multi-transmission data on the PDSCH through the PDCCH masked with the G-RNTI for interested single-cell multi-transmission. For example, through one of the DCI formats 0/1A/1C/3/3A which can be used in a common search space, scheduling information for single-cell multi-transmission data on the PDSCH may be addressed through the PDCCH.

The UE may receive single-cell multi-transmission data transmitted through shared PDSCH radio resources based on detailed information included in scheduling information after receiving the scheduling information. For example, the detailed information included in the scheduling information may include one or more of a carrier indicator, resource block allocation information, and MCS information. For example, the resource block allocation information may include a start point and a length of the resource block to which resources are allocated. In another example, the resource block allocation information may directly indicate resource blocks to which resources are allocated through a bitmap.

In another example, the detailed information included in the scheduling information may include one or more of a carrier indicator, resource block allocation information, and MCS information.

Figure 7:
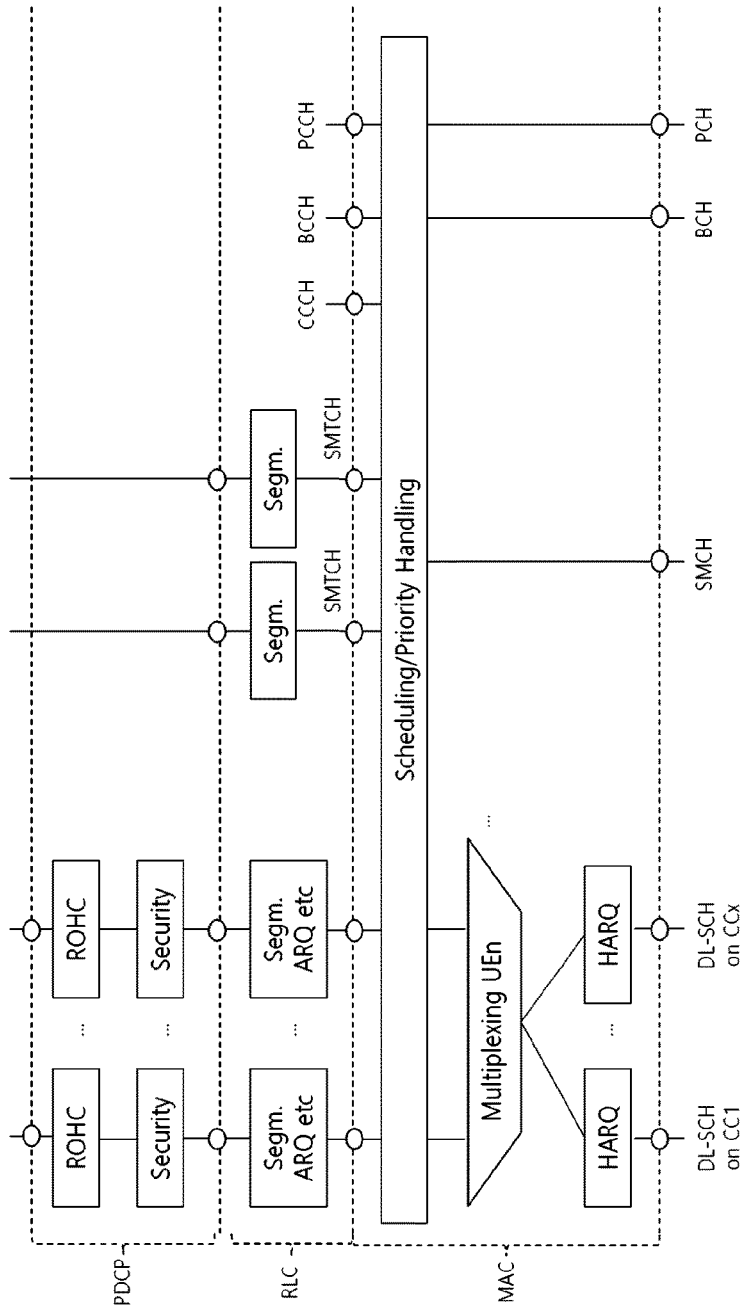
FIG. 7 illustrates an example of a layer 2 structure for downlink including single-cell multi-transmission.

FIG. 7 illustrates an example of a layer 2 structure for downlink including single-cell multi-transmission. Referring to FIG. 7, a logical channel (SMTCH of FIG. 7) for single-cell multi-transmission may be mapped to a transport channel (SMCH of FIG. 7) or a downlink shared channel (DL-SCH of FIG. 7) for single-cell multi-transmission.

The described embodiments and scenarios may be independently applied or combined together applied as the combination thereof. Further, such a method and apparatus for providing point-to-multipoint transmission in E-UTRAN in accordance with at least one embodiment of the present disclosure may be applied to point-to-multipoint transmission within a single cell as well as point-to-multipoint transmission performed independently or cooperatively by a plurality of cells or cells associated with a plurality of eNBs.

Hereinafter, operations of the eNB corresponding to the operations of the UE described above will be described with reference to FIG. 8 to FIG. 10. The eNB described below may perform all operations corresponding to the operations of the UE, which are previously described.

Figure 8:
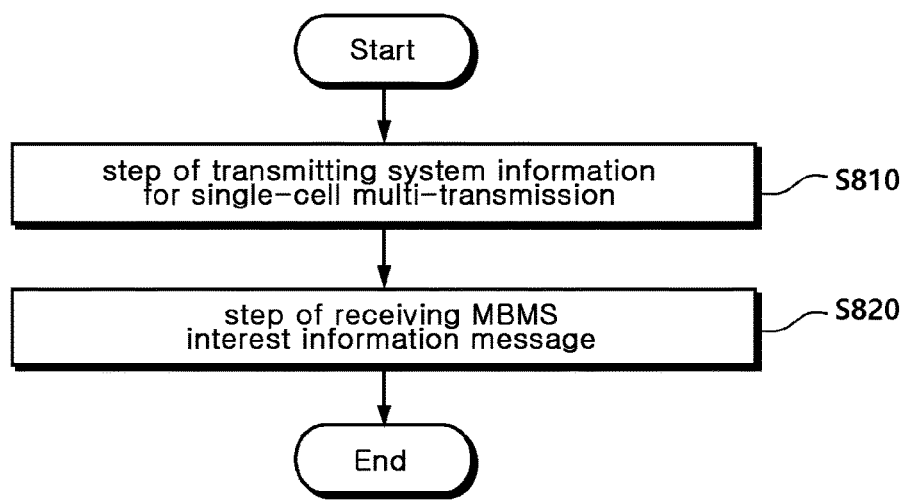
FIG. 8 illustrates an operation of an evolved node b (eNB) according to an embodiment of the present disclosure.

FIG. 8 illustrates operations of an eNB according to an embodiment of the present disclosure.

A method of transmitting single-cell multi-transmission data by an eNB according to an embodiment of the present disclosure may include transmitting system information for single-cell multi-transmission in a Primary Cell (PCell) and receiving a Multimedia Broadcast Multicast Service (MBMS) interest information message from the UE.

Referring to FIG. 8, the eNB may perform operations of transmitting system information for single-cell multi-transmission in the primary cell in S810. For example, the eNB may transmit the system information for the single-cell multi-transmission through the PCell configured in the UE, and the UE may receive the system information. For example, the eNB may broadcast information related to the single-cell multi-transmission through the system information. For example, the eNB may broadcast a G-RNTI through the system information. Alternatively, the eNB may broadcast a TMGI and a G-RNTI associated with the TMGI through the system information. Alternatively, the eNB may broadcast identification information for identifying a downlink service/session/bearer of a group communication service/session/bearer and a G-RNTI associated with the identification information through the system information. In another example, the eNB may broadcast information for receiving single-cell multi-transmission control information including the G-RNTI through the system information. Alternatively, the eNB may broadcast information for receiving single-cell multi-transmission control information including the TMGI and the G-RNTI associated with the TMGI through the system information. Alternatively, the eNB may broadcast information for receiving single-cell multi-transmission control information including identification information for identifying a downlink service/session/bearer of a group communication service/session/bearer and the G-RNTI associated with the identification information through the system information.

Further, the eNB may perform operations of receiving a Multimedia Broadcast Multicast Service (MBMS) interest information message from the UE in S820. The MBMS interest information message may be received when the UE configures an RRC connection or when interest group communication service information of a previous interest information message, which the UE transmitted lastly, is changed. Through the MBMS interest information message received from one or more UEs, the eNB may control group communication transmission through single-cell multi-transmission. For example, the eNB may initiate or terminate the single-cell multi-transmission based on information included in the MBMS interest information message. In another example, the eNB may trigger an active MBMS bearer procedure to a GCS AS based on the information included in the MBMS interest information message. In another example, the eNB may trigger the BM-SC to start the MBMS service/session/bearer based on the MBMS interest information message. In another example, the eNB may trigger the BM-SC to start the group communication service/session/bearer based on the MBMS interest information message. In another example, the eNB may select a target cell that provides single-cell multi-transmission based on the MBMS interest message of the UE.

Figure 9:
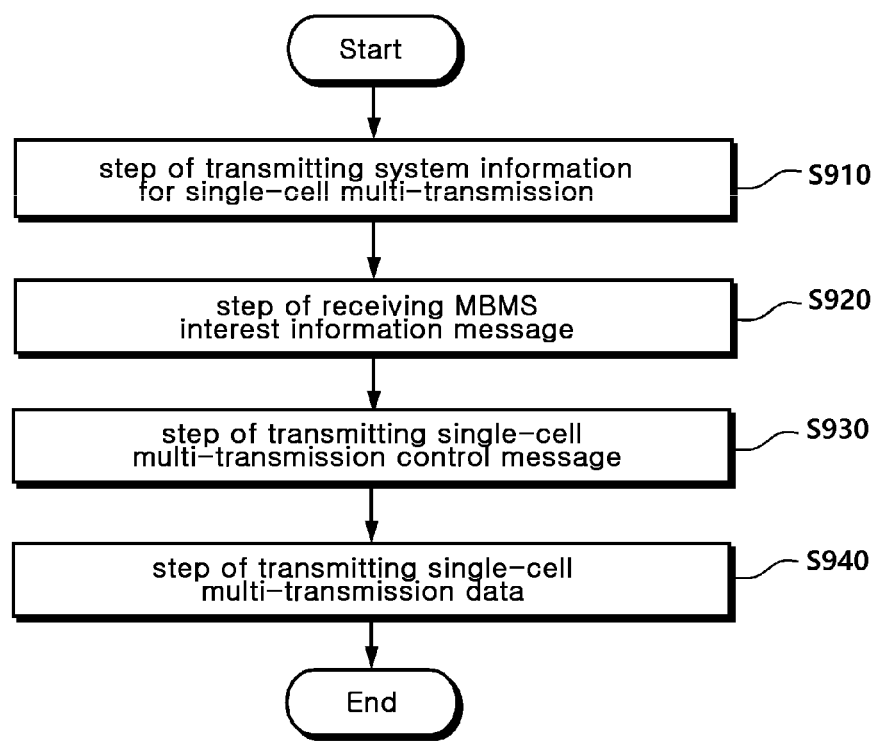
FIG. 9 illustrates an operation of an evolved node B (eNB) according to another embodiment of the present disclosure.

FIG. 9 illustrates operations of an eNB according to another embodiment of the present disclosure.

Referring to FIG. 9, similar to steps S810 and S820, the eNB may perform operations of transmitting system information for single-cell multi-transmission in a primary cell in S910. Further, the eNB may perform operations of receiving an MBMS interest information message from the UE in S920. The MBMS interest information message may include at least one piece of group communication service identification information (TMGI).

Further, the eNB of the present disclosure may perform operations of transmitting a single-cell multi-transmission control message based on single-cell identification information (SC-RNTI) for identifying single-cell multi-transmission control information in S930. The single-cell multi-transmission control message may include at least one of group communication service identification information (TMGI) and group identifier information (G-RNTI). Meanwhile, the G-RNTI may be set to be associated with the group communication service identification information. The UE may receive the single-cell multi-transmission control message, which the eNB has transmitted, based on the SC-RNTI. Further, the single-cell multi-transmission control message may be scheduled through a PDCCH.

Meanwhile, the eNB may perform operations of transmitting single-cell multi-transmission data based on the group identifier information (G-RNTI) in S940. For example, the eNB may transmit single-cell multi-transmission data through PDSCH radio resources. The eNB may transmit single-cell multi-transmission data to other UEs belonging to the same group as the corresponding UE through shared PDSCH radio resources. The eNB may transmit scheduling information for the PDSCH through a PDCCH area in order to transmit the single-cell multi-transmission data through the PDSCH radio resources. Meanwhile, the UE may identify whether the corresponding single-cell multi-transmission data is for interested group communication services based on the allocated G-RNTI.

The single-cell multi-transmission control message and the single-cell multi-transmission data may be scheduled through the PDCCH. For example, scheduling information of the single-cell multi-transmission control message and the single-cell multi-transmission data may be identified through the PDCCH area.

In addition, the eNB may perform all operations of the eNB required for executing the operations of the present disclosure described above.

Figure 10:
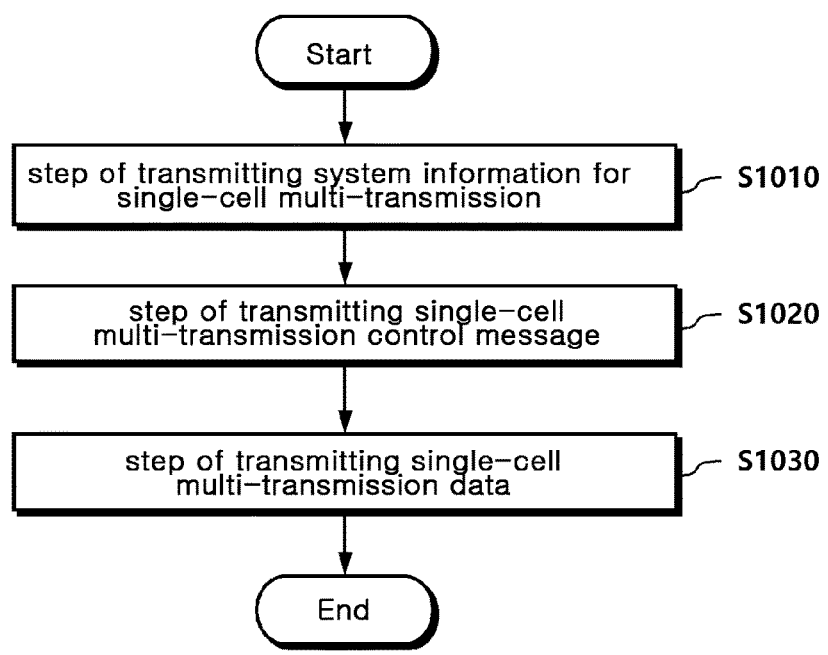
FIG. 10 illustrates an operation of an evolved node B (eNB) according to still another embodiment of the present disclosure.

FIG. 10 illustrates operations of an eNB according to still another embodiment of the present disclosure.

Referring to FIG. 10, the eNB of the present disclosure may perform operations of transmitting system information for single-cell multi-transmission in a primary cell in S1010. For example, the eNB may transmit system information for single-cell multi-transmission through the PCell configured in the UE and the UE may receive the system information. For example, the eNB may broadcast information related to the single-cell multi-transmission through the system information. For example, the eNB may broadcast a G-RNTI through the system information. Alternatively, the eNB may broadcast a TMGI and a G-RNTI associated with the TMGI through the system information. Alternatively, the eNB may broadcast identification information for identifying a downlink service/session/bearer of a group communication service/session/bearer and a G-RNTI associated with the identification information through the system information. In another example, the eNB may broadcast information for receiving single-cell multi-transmission control information including the G-RNTI through the system information. Alternatively, the eNB may broadcast information for receiving single-cell multi-transmission control information including the TMGI and the G-RNTI associated with the TMGI through the system information. Alternatively, the eNB may broadcast information for receiving single-cell multi-transmission control information including identification information for identifying a downlink service/session/bearer of a group communication service/session/bearer and the G-RNTI associated with the identification information through the system information.

The eNB may perform operations of transmitting a single-cell multi-transmission control message based on single-cell identification information (SC-RNTI) for identifying single-cell multi-transmission control information in S1020. The single-cell multi-transmission control message may include at least one of group communication service identification information (TMGI) and group identifier information (G-RNTI). Meanwhile, the G-RNTI may be set to be associated with the group communication service identification information. The UE may receive the single-cell multi-transmission control message, which the eNB has transmitted, based on the SC-RNTI. Further, the single-cell multi-transmission control message may be scheduled through a PDCCH.

The eNB may perform operations of transmitting single-cell multi-transmission data based on the group identifier information (G-RNTI) in S1030. For example, the eNB may transmit single-cell multi-transmission data through PDSCH radio resources. The eNB may transmit single-cell multi-transmission data to other UEs belonging to the same group as the corresponding UE through shared PDSCH radio resources. The eNB may transmit scheduling information for the PDSCH through a PDCCH area in order to transmit the single-cell multi-transmission data through the PDSCH radio resources. Meanwhile, the UE may identify whether the corresponding single-cell multi-transmission data is for group communication services in which the UE is interested based on the allocated G-RNTI. The single-cell multi-transmission control message and the single-cell multi-transmission data may be scheduled through the PDCCH. For example, scheduling information of the single-cell multi-transmission control message and the single-cell multi-transmission data may be identified through the PDCCH area.

As described above, the present disclosure has an effect of providing a detailed method of transmitting downlink multicast/group cast/group communication data to UEs in a particular group within one cell through shared PDSCH radio resources. Further, the present disclosure has an effect of providing a continuous service while reducing service interruption even when the cell is changed due to movement of the UE.

Configurations of the UE and the eNB which may perform some or all of the operations of the present disclosure will be briefly described.

Figure 11:
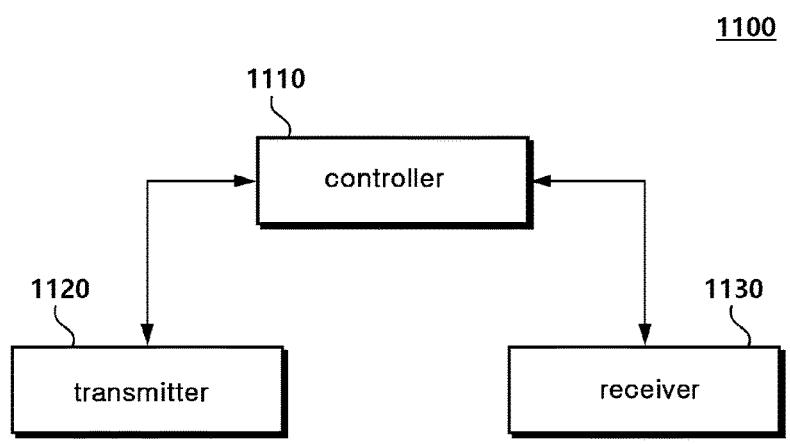
FIG. 11 illustrates a configuration of a user equipment (UE) according to an embodiment of the present disclosure.

FIG. 11 illustrates a UE according to an embodiment of the present disclosure.

Referring to FIG. 11, a UE 1100 may include a receiver 1130 for receiving system information for single-cell multi-transmission in a Primary Cell (PCell), a controller 1110 for determining whether to transmit a Multimedia Broadcast Multicast Service (MBMS) interest information message, and a transmitter 1120 for transmitting the MBMS interest information message.

When the UE configures an RRC connection or when interest group communication service information of a previous interest information message which the UE transmitted lastly is changed, the controller 1110 may determine to transmit the MBMS interest information message. Further, the controller 1110 may control the overall operation of the UE 1100 required for implementing the present disclosure as the UE 1100 receives group communication data through a PDSCH or the RRC-connected UE receives group communication data through a PDSCH while minimizing service interruption due to movement from a cell to another cell.

The receiver 1130 may receive a single-cell multi-transmission control message based on single-cell identification information (Single Cell-RNTI: SC-RNTI) for identifying single-cell multi-transmission control information. The single-cell multi-transmission control message may include at least one of group communication service identification information (Temporary Mobile Group Identity: TMGI) and group identifier information (G-RNTI), and the group identifier information may be set to be associated with the group communication service identification information. Further, the receiver 1130 may receive single-cell multi-transmission data based on the group identifier information (Group-RNTI: G-RNTI). In addition, the receiver 1130 may receive downlink control information, data, and a message from the eNB through a corresponding channel. The single-cell multi-transmission control message or single-cell multi-transmission data is scheduled through a Physical Downlink Control Channel (PDCCH).

The transmitter 1120 may transmit an MBMS interest information message, and the MBMS interest information message may include at least one of group communication service identification information (Temporary Mobile Group Identity: TMGI). Further, the transmitter 1120 transmits uplink control information, data, and a message to the eNB through a corresponding channel.

Figure 12:
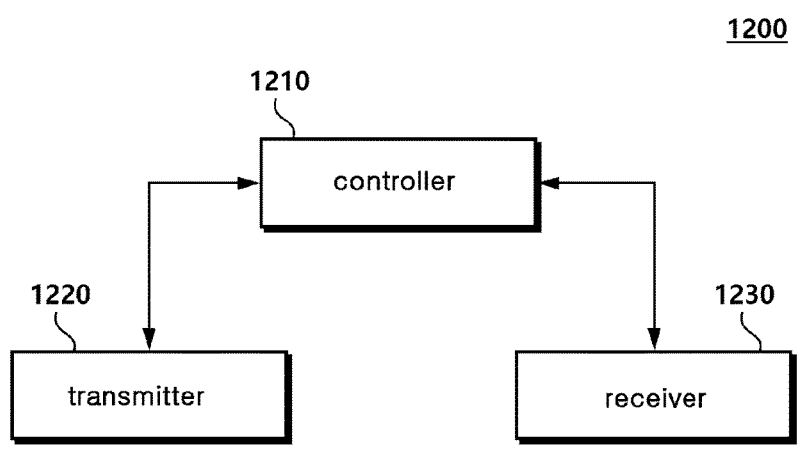
FIG. 12 illustrates a configuration of an evolved node B (eNB) according to an embodiment of the present disclosure.

FIG. 12 illustrates an eNB according to an embodiment of the present disclosure.

Referring to FIG. 12, an eNB 1200 may include a transmitter 1220 for transmitting system information for single-cell multi-transmission in a Primary Cell (PCell) and a receiver 1230 for receiving a Multimedia Broadcast Multicast Service (MBMS) interest information message from the UE.

The controller 1210 may control overall operation of the eNB 1200 required for implementing the embodiments of the present disclosure as the UE receives group communication data through a PDSCH or the RRC-connected UE receives group communication data through a PDSCH while minimizing service interruption according to movement from a cell to another cell.

The transmitter 1220 may transmit a single-cell multi-transmission control message based on single-cell identification information (Single Cell-RNTI: SC-RNTI) for identifying single-cell multi-transmission control information. The single-cell multi-transmission control message may include at least one of group communication service identification information (Temporary Mobile Group Identity: TMGI) and group identifier information (G-RNTI), and the group identifier information may be set to be associated with the group communication service identification information. Further, the transmitter 1220 may transmit single-cell multi-transmission data based on the group identifier information (Group-RNTI: G-RNTI).

The single-cell multi-transmission control message or the single-cell multi-transmission data is scheduled through a Physical Downlink Control Channel (PDCCH).

When the UE configures an RRC connection or when interest group communication service information of a previous interest information message, which the UE transmitted lastly, is changed, the receiver 1230 may receive the MBMS interest information message. The MBMS interest information message may include at least one piece of group communication service identification information (TMGI).

In addition, the transmitter 1220 and the receiver 1230 may be used for transmitting and receiving a signal or a message and data required for implementing the embodiments of the above-described present disclosure to and from the UE.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

CROSS-REFERENCE TO RELATED APPLICATION

This application claims priority from and the benefit under 35 U.S.C. § 119(a) of Korean Patent Application Nos. 10-2015-0002930, filed on Jan. 8, 2015, and 10-2015-0185653, filed on Dec. 24, 2015, which are hereby incorporated by reference for all purposes as if fully set forth herein. In addition, this non-provisional application claims priorities in countries other than the U.S. for the same reason based on the Korean Patent Applications, the entire contents of which are hereby incorporated by reference.

The invention claimed is:

1. A method of receiving single-cell multi-transmission data by a user equipment (UE), the method comprising:
receiving system information for single-cell multi-transmission in a Primary Cell (PCell);
determining whether to transmit a Multimedia Broadcast Multicast Service (MBMS) interest information message;
transmitting the MBMS interest information message;
receiving, through a downlink data channel, a single-cell multi-transmission control message, based on single-cell identification information (Single Cell-RNTI: SC-RNTI) for identifying the single-cell multi-transmission control information; and
receiving, through a downlink data channel, single-cell multi-transmission data, based on single-cell multi-transmission control information included in the received single-cell multi-transmission control message,
wherein the determining includes:
determining to transmit the MBMS interest information message when interest group communication service information of a previous interest information message, which the UE transmitted lastly, is changed; and
wherein:
the single-cell multi-transmission control message includes at least one piece of i) group communication service identification information including a Temporary Mobile Group Identity (TMGI) and ii) group identifier information (Group-RNTI: G-RNTI);
the group identifier information (G-RNTI) is set to be associated with the group communication service identification information;
the single-cell multi-transmission control message is scheduled through a Physical Downlink Control Channel (PDCCH) masked with the single-cell identification information (SC-RNTI); and
the single-cell multi-transmission data is scheduled through a PDCCH masked with the group identifier information (G-RNTI).

2. The method of claim 1, wherein the MBMS interest information message includes at least one piece of the group communication service identification information including the TMGI.

3. The method of claim 1,
wherein the single-cell multi-transmission data is received based on the group identifier information (G-RNTI).

4. The method of claim 1, wherein the determining further includes:
determining to transmit the MBMS interest information message when the UE establishes a radio resource control (RRC) connection.

5. The method of claim 1, wherein the downlink data channel includes a Physical Downlink Shared Channel (PDSCH).

6. A method of transmitting single-cell multi-transmission data by a base station, the method comprising:
transmitting system information for single-cell multi-transmission in a Primary Cell (PCell);
receiving a Multimedia Broadcast Multicast Service (MBMS) interest information message from a user equipment (UE);
transmitting, through a downlink data channel, a single-cell multi-transmission control message including single-cell multi-transmission control information to be used by the UE for reception of single-cell multi-transmission data, based on single-cell identification information (Single Cell-RNTI: SC-RNTI) for identifying single-cell multi-transmission control information; and
transmitting, through a downlink data channel, the single-cell multi-transmission data,
wherein the receiving includes:
receiving the MBMS interest information message when interest group communication service information of a previous interest information message, which the UE transmitted lastly, is changed; and
wherein:
the single-cell multi-transmission control message includes at least one piece of i) group communication service identification information including a Temporary Mobile Group Identity (TMGI) and ii) the group identifier information (G-RNTI);
the group identifier information (G-RNTI) is set to be associated with the group communication service identification information;
the single-cell multi-transmission control message is scheduled through a Physical Downlink Control Channel (PDCCH) masked with the single-cell identification information SC-RNTI); and
the single-cell multi-transmission data is scheduled through a PDCCH masked with the group identifier information (G-RNTI).

7. The method of claim 6, wherein the MBMS interest information message includes the group communication service identification information including the TMGI.

8. The method of claim 6,
wherein the single-cell multi-transmission data is transmitted based on the group identifier information (G-RNTI).

9. The method of claim 6, wherein the receiving further includes:

receiving the MBMS interest information message when the UE establishes a radio resource control (RRC) connection.

10. The method of claim 6, wherein the downlink data channel includes a Physical Downlink Shared Channel (PDSCH).

11. A user equipment (UE) receiving single-cell multi-transmission data, the UE comprising:
- a receiver configured to receive system information for single-cell multi-transmission in a Primary Cell (PCell);
- a controller configured to determine whether to transmit a Multimedia Broadcast Multicast Service (MBMS) interest information message; and
- a transmitter configured to transmit the MBMS interest information message,
- wherein the receiver is configured to further perform:
- receiving, through a downlink data channel, a single-cell multi-transmission control message, based on single-cell identification information (Single Cell-RNTI: SC-RNTI) for identifying the single-cell multi-transmission control information; and
- receiving, through a downlink data channel, the single-cell multi-transmission data, based on single-cell multi-transmission control information included in the received single-cell multi-transmission control message;
- wherein the controller determines to transmit the MBMS interest information message when interest group communication service information of a previous interest information message, which the UE transmitted lastly, is changed; and wherein:
- the single-cell multi-transmission control message includes at least one piece of i) group communication service identification information including a Temporary Mobile Group Identity (TMGI) and ii) group identifier information (Group-RNTI: G-RNTI);
- the group identifier information (G-RNTI) is set to be associated with the group communication service identification information;
- the single-cell multi-transmission control message is scheduled through a Physical Downlink Control Channel (PDCCH) masked with the single-cell identification information (SC-RNTI); and
- the single-cell multi-transmission data is scheduled through a PDCCH masked with the group identifier information (G-RNTI).

12. The UE of claim 11, wherein the MBMS interest information message includes the group communication service identification information including the TMGI.

13. The UE of claim 11, wherein the receiver receives the single-cell multi-transmission data based on the group identifier information (G-RNTI).

14. The UE of claim 11, the determination of the controller further includes:
- determining to transmit the MBMS interest information message when the UE establishes a radio resource control (RRC) connection.

15. The UE of claim 11, wherein the downlink data channel includes a Physical Downlink Shared Channel (PDSCH).

* * * * *